H. E. MILLER.
WEIGHING PAN FOR COAL TIPPLES.
APPLICATION FILED DEC. 17, 1910.
998,918.
Patented July 25, 1911.
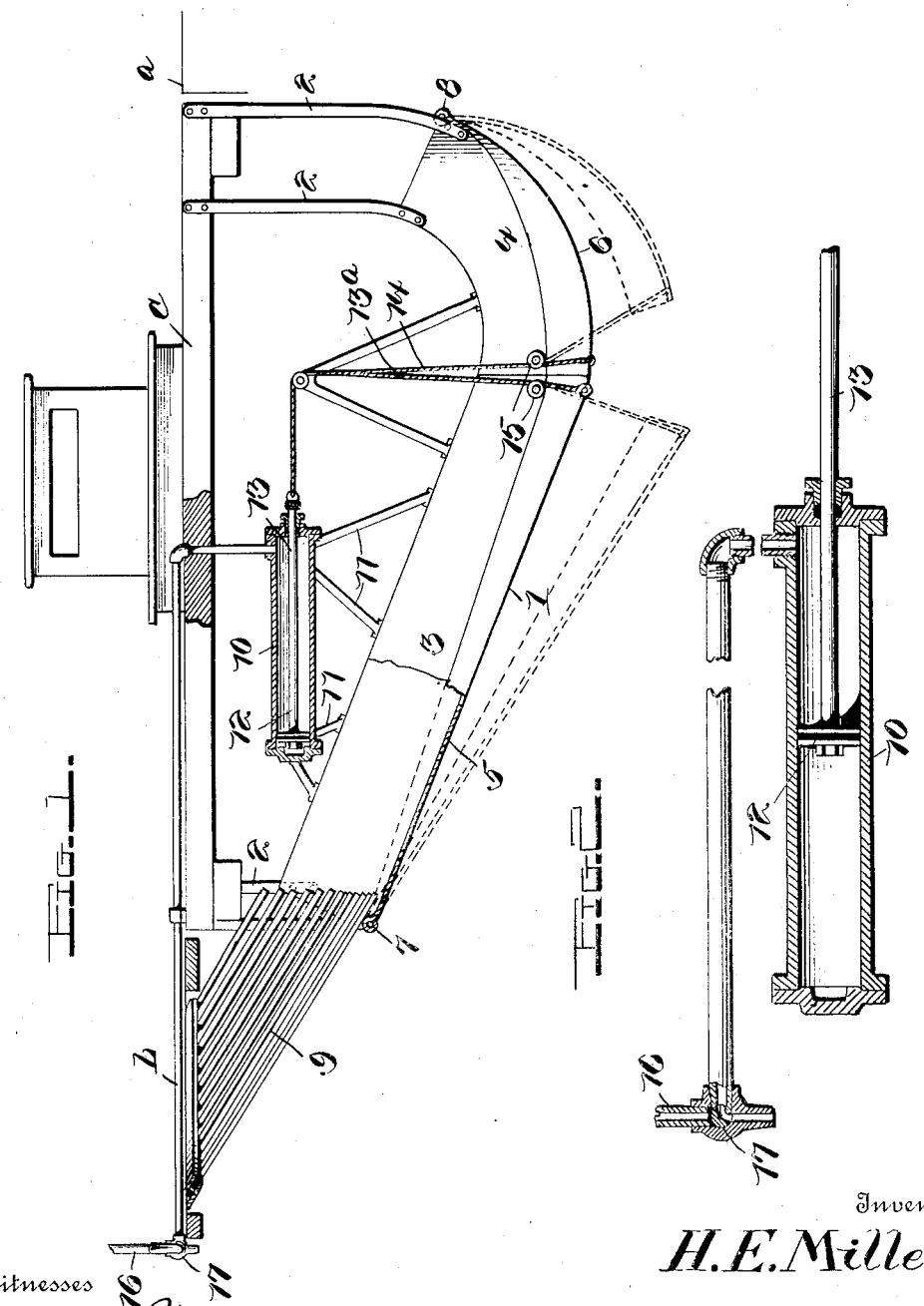
Inventor
H.E.Miller.

UNITED STATES PATENT OFFICE.

HARRY E. MILLER, OF FORD CITY, PENNSYLVANIA.

WEIGHING-PAN FOR COAL-TIPPLES.

998,918.

Specification of Letters Patent.

Patented July 25, 1911.

Application filed December 17, 1910. Serial No. 597,860.

*To all whom it may concern:*

Be it known that I, HARRY E. MILLER, a citizen of the United States, residing at Ford City, in the county of Armstrong and State of Pennsylvania, have invented certain new and useful Improvements in Weighing-Pans for Coal-Tipples, of which the following is a specification, reference being had to the accompanying drawings.

This invention relates to improvements in weighing pans for coal tipples, and especially with reference to means for operating the weighing pan, the object of the invention being to provide, in connection with a weighing pan of this class, fluid pressure operating means for actuating the hinged bottom sections of the weighing pan.

The invention consists in the construction, combination and arrangement of devices hereinafter described and claimed.

In the accompanying drawings—Figure 1 is partly an elevation and partly a sectional view of a weighing pan provided with operating apparatus constructed in accordance with my invention, and showing the bottom sections of the weighing pan closed in full lines, and open to dump the coal from the weighing pan in dotted lines. Fig. 2 is a detail sectional view of the fluid pressure operated apparatus for controlling the bottom sections of the weighing pan.

For the purposes of this specification, the floor level is indicated at $a$, in Fig. 1, a coal dump at $b$, and the platform, beam or other element of a scale is indicated at $c$. The weighing pan 1, is suspended from the scale element $c$, as by means of rods 2, which connect the corners of the weighing pan to the scale element. The weighing pan is trough shaped and comprises a relatively long inclined arm or portion 3 and a relatively short upwardly curved arm or portion 4, which is connected to and rises from the lower portion of the arm 3. The weighing pan is provided with dump bottom sections 5, 6, which are respectively hinged as at 7, 8, at their outer ends to the corresponding ends of the arms 3, 4, of the weighing pan, and are adapted to be raised or lowered at their free ends so as to close or open the bottom of the weighing pan. The usual inclined screen to discharge the coal from the dump $b$, into the longer arm 3 of the weighing pan is indicated at 9.

In accordance with my invention, I provide a horizontally disposed cylinder 10, which is mounted above and longitudinally of the long arm 3 of the weighing pan, and is here shown as provided with supporting legs 11 which bear and are secured on the sides of the said arm 3 of the weighing pan. A piston 12 operates in the cylinder 10 and has a rod 13, provided with suitable means for the attachment thereto, of wires, chains, or other suitable flexible elements 13$^a$, 14, which are respectively connected to the free ends of the dump bottom sections 5, 6, of the weighing pan, and engage suitable direction elements 15. Hence when the piston moves outwardly in the cylinder the dump bottom sections of the weighing pan are opened and lowered so as to discharge the coal between their free ends, and when the piston is moved inwardly in the cylinder, it causes the flexible elements 13$^a$, 14 to close the said dump bottom sections as will be understood.

A pipe 16 to supply steam or compressed air to the cylinder is provided with a suitable valve 17 which serves when turned in one position to admit the steam or compressed air to the cylinder so as to force the piston inwardly in the cylinder, and when turned in another position, permits the discharge of steam or compressed air from the cylinder so as to permit the piston to move outwardly in the cylinder, and thereby permit the dump bottom sections of the weighing pan to open, and discharge the contents of the weighing pan. This valve is located near the dump $b$ in convenient reach of the operator.

While the coal pan is being loaded from the dump $b$, the dump bottom sections thereof are held in closed position by the pressure of the steam or compressed air in the cylinder, and against the piston 12. When any desired quantity of coal is in the pan, it may be discharged therefrom, by merely turning the valve 17 so as to cut off the supply of steam or compressed air to the cylinder and permit such steam or compressed air as is in the cylinder to be discharged therefrom, as will be understood.

I claim:—

A weighing pan of the class described comprising a relatively long inclined trough-shaped arm and a relatively short upwardly curved arm connected to and rising from the lower end of the inclined arm, the said arms having common vertical side walls and being respectively provided with dump bottom sections which are respectively hinged at their outer ends to the corresponding ends of the said arms so that the said dump bottom sections are adapted to close and open at the converging ends of the said arms, in combination with a cylinder, a piston therein, connections between the piston and dump bottom sections of the weighing pan to cause said dump bottom sections to be operated by the movement of the piston, and means to supply fluid under pressure to the cylinder and to exhaust the same therefrom to operate the piston.

In testimony whereof I hereunto affix my signature in the presence of two witnesses.

HARRY E. MILLER.

Witnesses:
  H. H. HAILMAN,
  R. CLYDE LAW.